United States Patent [19]

Soldanski et al.

[11] Patent Number: 4,554,083
[45] Date of Patent: Nov. 19, 1985

[54] LIQUID LEATHER CARE COMPOSITIONS

[75] Inventors: Heinz-Dieter Soldanski, Essen; Bernd-Dieter Holdt, Duesseldorf, both of Fed. Rep. of Germany

[73] Assignee: Henkel KGaA, Duesseldorf, Fed. Rep. of Germany

[21] Appl. No.: 624,541

[22] Filed: Jun. 26, 1984

[30] Foreign Application Priority Data

Jul. 2, 1983 [DE] Fed. Rep. of Germany ....... 3323939

[51] Int. Cl.$^4$ .......................... C09G 1/04; C09G 1/10; C14C 11/00
[52] U.S. Cl. ................................. 252/8.57; 524/104; 524/247; 524/277; 524/279; 524/285
[58] Field of Search .............. 524/277, 285, 104, 247; 252/8.57; 106/10; 544/279

[56] References Cited

U.S. PATENT DOCUMENTS 2,776,268  1/1967  Moffitt et al. ...................... 524/277

FOREIGN PATENT DOCUMENTS 0017119 10/1980 European Pat. Off. ............ 524/277
0036956 10/1981 European Pat. Off. .
1769467  3/1972 Fed. Rep. of Germany .
 104316  3/1974 Fed. Rep. of Germany .
2332312  6/1977 France .

Primary Examiner—Allan M. Lieberman

Attorney, Agent, or Firm—Ernest G. Szoke; Henry E. Millson, Jr.; Mark A. Greenfield

[57] ABSTRACT

Liquid leather-care compositions in the form of aqueous dispersions having a pH in the range of from about 7 to about 8, and containing the following non-aqueous constituents:

(a) from about 15 to about 45% of at least one wax from the group consisting of carnauba wax, candelilla wax, and montanic acid ester wax;
(b) from about 10 to about 30% lanolin;
(c) from about 20 to about 45% of at least one dispersible, film-forming aliphatic polyurethane resin;
(d) from about 1 to about 4% of at least one water-soluble polymeric polycarboxylic acid;
(e) from about 6 to about 24% of at least one nonionic emulsifier;
(f) from 0 to about 2% of at least one water-soluble hydroxyalkylamine containing from 2 to 12 carbon atoms;
(g) from 0 to about 5% of at least one of perfume oils, preservatives, foam inhibitors, emulsifying aids, and dyes; and
(h) from 0 to about 25% of at least one liquid flow promoter;

where the above percentages are percentages by weight based on the total weight of the nonaqueous constituents and the sum of the nonaqueous constituents is from about 3 to about 20% by weight of the aqueous dispersion.

14 Claims, No Drawings

LIQUID LEATHER CARE COMPOSITIONS

BACKGROUND OF THE INVENTION

Self-shine emulsions for floors have been in use for many years both in the home and in factories and offices. There has been no shortage of attempts to use these products for other purposes, for example for treating shoes.

However, whereas floor coverings (plastic, wood or stone) are essentially non-deformable, inelastic materials which do not undergo any deformation, even under foot, leather is a deformable, stretchable, elastic and supple material which, when worn in the form of shoe uppers, is required to show all these properties which are specific to leather. Added to this is the fact that shoe-care preparations are generally applied daily or after each wearing, whereas self-shine emulsions for floors are normally only applied at intervals of 1 to 6 months. These differences between floor coverings and leather make it easy to understand why the requirements which a product for floors and a shoe- and leather-care preparation have to satisfy are totally different. Attempts to use products developed for treating floors as shoe- and leather-care preparations have failed for the following reasons:

1. On leather, self-shine emulsions for floors lead to breakage and separation of the film from the shoe upper leather due to the inadequate elasticity and flexibility of the film.
2. Even after a few applications, self-shine emulsions for floors build up thick films, resulting in the formation of coatings on the shoe upper leather; in masking of the natural grain of the leather; in crust formation; and in loss of the breathing ability of the leather.
3. Because of pH-values of 9 and higher, self-shine emulsions developed for floors cause embrittlement of, and attack on, the leather, causing it to crack.
4. Conventional self-shine emulsions do not properly care for leather nor keep it soft; they also impair its elasticity.

These findings are also confirmed by tests on various leather surfaces conducted with products and inventions in the field of self-shine floor cleaning preparations; see for example German Application No. 17 69 467, French Patent No. 2,332,312 and East German Patent No. 104,316.

It was only recently that successful attempts were made, by combining selected quantities of certain active substances, to develop self-shine emulsions of the type which could also be used for shoe and leather care (European Patent Applications No. 17 119, and No. 36 956). Such self-shine emulsions are distinguished by their ability to form elastic and deformable films which withstand the severe deformation and flexing encountered in leather wear and which, at the same time, provide the leather with a high shine without any need for polishing. By virtue of their favorable performance properties, products of this type have found an established place in the shoe-care market although they are mainly limited in their application to smooth, heavily covered leather.

This limitation emanates in particular from the fact that, when treated with preparations of the type in question, natural leather, leather finished with a silk - like sheen or leather deliberately kept dull readily undergoes a change in its surface character through excessive gloss build up and also from the observation that light, pastel-colored, and uncovered or substantially uncovered leather often darkens or becomes patchy, a disadvantage which is mainly attributable to the considerable content of low-boiling solvents in those compositions. The disadvantages referred to cannot be obviated simply by changes to the formulations of the compositions, such as reducing their solids content and the quantities of solvent present. On the contrary, changes such as these produce deteriorations in other properties, such as the flexibility of the film.

DESCRIPTION OF THE INVENTION

In a search for effective solutions to the problems outlined above, it has now been found that certain aqueous dispersions which esssentially contain waxes, lanolin, polyurethane resins as the principal film formers, polymeric polycarboxylic acids as pH-regulators and nonionic emulsifiers in a selected composition and which are free from low-boiling organic solvents are eminently suitable for the care of sensitive leathers, particularly natural and mat leathers.

The present invention relates to a liquid shoe- and leather-care preparation in the form of an aqueous dispersion having a pH-value of from 7 to 8, wherein the nonaqueous constituents are as follows, in which the parts by weight are based on the total weight of the nonaqueous constituents:

(a) from about 15 to about 45%, preferably from about 20 to about 30% by weight of at least one wax from the group carnauba, candelilla and montanic acid ester wax, (b) from about 10 to about 30%, preferably from about 12 to about 20% by weight of lanolin, (c) from about 20 to about 45%, preferably from about 25 to about 40% by weight of at least one dispersible, film-forming aliphatic polyurethane resin, (d) from about 1 to about 4% by weight of at least one water-soluble polymeric polycarboxylic acid, (e) from about 6 to about 24%, preferably from about 12 to about 18% by weight of at least one non-ionic emulsifier, (f) from 0 to about 2% by weight of at least one watersoluble hydroxyalkyl amine containing from 2 to 12 carbon atoms, (g) from 0 to about 5%, preferably from about 0.05 to about 5% by weight of one or more of perfume oil, preservatives, foam inhibitors, emulsifying aids and dyes, (h) from 0 to about 25% by weight of at least one liquid flow promoter; the total weight of the non-aqueous constituents making up from about 3 to about 20%, preferably from about 4 to about 12% by weight of the dispersion.

Compared with known self-shine shoe-care preparations, the compositions of the invention are distinguished by the fact that light, pastel-colored, uncovered or substantially uncovered leathers treated with it no longer darken or turn patchy, while natural leather, leather finished with a silk-like sheen or mat leather are not spoiled by an excessive build up of gloss. These results are achieved without having to relinquish any advantages, such as the formation of non-marring, elastic and flexible films, the care of the leather by lanolin, and elimination of the need for polishing. However, the compositions of the invention are not limited in their application to the care of low-shine leathers of the type mentioned above because the films which the present compositions produce do not in any way affect the shine of glossy leathers. Accordingly, the new compositions can be universally used for all types of leather.

The waxes (constituent a) above) present in the instant compositions are natural waxes, such as candelilla wax or carnauba wax, or chemically modified montan waxes of the montanic ester wax type. Montanic acid ester waxes having acid numbers of from about 25 to about 35, saponification numbers of from about 115 to about 155 and a dropping point of from about 75° to about 90° C. are particularly suitable.

Although it may also be called a wax, lanolin is separately set forth as a constituent (b) above), because not only does it contribute towards film formation, it also largely determines the caring properties of the composition. Purified lanolin, which is preferably used for the compositions of the invention, has the following average characteristics:

Dropping point 36°–42° C.
Saponification No. 88–102
Iodine No. 18–32
Free cholesterol 1%
Bound cholesterol 16–18%.

Of the many known polyurethane resins (constituent c) above), dispersible, film-forming aliphatic types are used in the present compositions. Polyurethane resins such as these, which can also be slightly crosslinked, are produced in one or more successive addition reactions from aliphatic diisocyanates and aliphatic diols and, optionally, relatively small quantities of aliphatic diamines which serve as chain extenders. Suitable diisocyanates are, for example, hexamethylene diisocyanate and 4,4'-diisocyanatodicyclohexylmethane. Particularly suitable diols are hydroxyl-terminated aliphatic polyesters of the type obtained, for example, from adipic acid and short-chain aliphatic diols containing from 2 to 6 carbon atoms or hydroxyl-terminated polyesters of the type obtained, for example, by the polymerization of ethylene oxide, propylene oxide or tetrahydrofuran. In general, low molecular weight diols, such as ethylene glycol and 1,6-hexane diol, are directly used in only small quantities in the production of the polyurethanes; in that case, their function, like that of the aliphatic diamines, for example ethylene diamine and hexamethylene diamine, is the chain extension and modification of already formed polyurethanes still containing isocyanate groups. The molar ratio of diisocyanate to the sum of its addition partners can be between about 1.0 to about 0.8 for the polyurethane resins usable herein.

In the present combination of active substances, the above described polyurethane resins give elastic films which rapidly reach the necessary non-marring point and which withstand even severe stressing in wear without any need for further resin-like or polymeric film formers, such as polyacrylates or polyethylenes. Particularly favorable properties are shown by those compositions in which the polyurethane resins have been produced from aliphatic diisocyanates containing from 8 to 38 carbon atoms and hydroxyl-terminated aliphatic polyesters having an average molecular weight of from about 500 to about 5000 or aliphatic, hydroxyl-terminated polyethers having an average molecular weight of from about 200 to about 6000.

Suitable polyurethane resins are commercially available, including for example the already dispersed products manufactured by Polyvinyl Chemie which are marketed under the name of NeoRez ®:

| NeoRez ® type | Solids content % by weight | Acid No. | Density g/cc | Water content % by weight | Flow promoter % by weight/ type |
|---|---|---|---|---|---|
| R 960 | 34 ± 1 | 30 | 1.05 | 48 | 17/MP* |
| R 962 | 34 ± 1 | 30 | 1.07 | 49 | 17/MP* |
| R 970 | 40 ± 1 | 16 | 1.03 | 60 | 0 |
| R 974 | 40 ± 1 | 18 | 1.03 | 56 | 4/MP* |

*MP = N—methylpyrrolidone

Small quantities of water-soluble polymeric poly-carboxylic acids (constituent d) above) are added to regulate the pH-value which should be between about 7 and about 8 in the compositions of the invention. These polymeric polycarboxylic acids stabilize the pH-value against random fluctuations, so that any shift toward ranges which would cause sensitive leathers to darken is avoided without affecting the properties of the film on the leather. Suitable pH-regulators are the water-soluble homopolymers of acrylic acid, methacrylic acid and maleic acid and also the water-soluble copolymers of those monomers with one another and with other polymerizable molecules, such as alkylvinyl ethers and olefins. Polyacrylic acid having an average molecular weight of from about 1000 to about 100,000 is preferably used herein.

The emulsifiers used (constituent e) above) are nonionic compounds of the type obtainable, for example, by reacting ethylene oxide with long-chain alcohols, alkyl phenols or fatty acid amides. It is preferred to use the reaction products of from 6 to 30 moles of ethylene oxide and primary alcohols containing from 12 to 18 carbon atoms or alkyl phenols containing from 6 to 14 carbon atoms in the alkyl group.

The addition of water-soluble hydroxyalkylamines containing from 2 to 12 carbon atoms (optional constituent f)), preferably mono-, di- or triethanolamine, enhances formation of the dispersions.

Another important feature of the compositions of the invention is the absence of readily volatile organic solvents, such as petroleum fractions, chlorinated hydrocarbons or terpenes, and of alcoholic solvents which, in conventional preparations, have frequently upset the water balance in the leather and have resulted in embrittlement of the leather. By contrast, certain high-boiling organic solvents, which are normally used as flow promoters for improving film formation, such as tris-(ethylhexyl)-phosphate, isophorone and, preferably, N-methyl pyrrolidone, can be used herein (optional constituent h) above) without any adverse effect upon the caring properties.

In addition to the constituents set forth above, the compositions of the invention can contain other ingredients (optional constituent g) above) of the type commonly used in shoe-care preparations, providing they are compatible with the other constituents. Ingredients such as these include, for example, perfume oils, preservatives, foam inhibitors and dyes and also emulsifying aids which may be present, for example, as residual impurities in prefabricated starting materials.

The production of the compositions of the invention does not involve any complications. Thus, the dispersions can readily be prepared by stirring the individual constituents into water in any suitable sequence. However, two or even more constituents, for example lanolin, wax and the emulsifier, are usually premixed, optionally with heating, and then mixed together with the other constituents. It has proved to be of particular advantage initially to convert one or more constituents into a dispersion of, optionally, relatively high concentration and then to add the remaining constituents to that dispersion. This procedure is best adopted in instances where commercially available polyurethane dispersions are used.

The invention will be illustrated by the following example which has been given for that purpose only and not for purposes of limitation.

EXAMPLE

An aqueous dispersion having the following composition was prepared (% by weight is based on the total weight of aqueous dispersion):

| | |
|---|---|
| Montanic acid ester wax | 1.25 % by weight |
| Lanolin | 0.85 % by weight |
| Tallow alcohol + 23 EO | 0.20 % by weight |
| Nonylphenol + 6 EO | 0.60 % by weight |
| Diethanolamine | 0.05 % by weight |
| Aliphatic polyurethane resin (solid of Neo/Rez 962 ®) | 1.70 % by weight |
| Katon ® (preservative) | 0.002 % by weight |
| Polyacrylic acid | 0.10 % by weight |
| Silicone foam inhibitor | 0.01 % by weight |
| Perfume | 0.10 % by weight |
| N—methylpyrrolidone | 0.85 % by weight |
| Water | remainder to 100 % by weight |

The dispersion was prepared in several stages. First, an approximately 20% wax emulsion was prepared by melting the montanic acid ester wax, lanolin, emulsifiers and diethanolamine and stirring the resulting melt into water. A calculated quantity of the emulsion thus formed was then diluted with more water, followed by addition of the prediluted polyacrylic acid, the preservative, the perfume, and the foam inhibitor. Finally, the NeoRez 962 ® (Polyvinyl Chemie) which already contained the N-methylpyrrolidone was added to the polyurethane dispersion with thorough stirring.

The milky, free-flowing dispersion formed, of which the nonaqueous component amounted to 5.7%, had a pH-value of 7.8. It was eminently suitable for treating mat and natural leathers to which it could be applied by means of a sponge or cloth, but advantageously from a suitable dispenser with a foam applicator.

What is claimed is:

1. A liquid leather-care composition in the form of an aqueous dispersion having a pH in the range of from about 7 to about 8, comprising the following non-aqueous constituents:
   (a) from about 15 to about 45% of at least one wax from the group consisting of carnauba wax, candelilla wax, and montanic acid ester wax;
   (b) from about 10 to about 30% lanolin;
   (c) from about 20 to about 45% of at least one dispersible, film-forming aliphatic polyurethane resin which is an addition reaction product of an aliphatic diisocyanate and an aliphatic diol, and, optionally, a relatively small quantity of an aliphatic diamine, wherein the molar ratio of diisocyanate to the sum of the diol and the diamine is between about 1.0 and about 0.8;
   (d) from about 1 to about 4% of at least one water-soluble polymeric polycarboxylic acid;
   (e) from about 6 to about 24% of at least one nonionic emulsifier which is a reaction product of ethylene oxide and either a long-chain alcohol, an alkyl phenol, or a fatty acid amide;
   (f) from 0 to about 2% of at least one water-soluble hydroxyalkylamine containing from 2 to 12 carbon atoms;
   (g) from 0 to about 5% of at least one of perfume oils, preservatives, foam inhibitors, emulsifying aids, and dyes; and
   (h) from 0 to 25% of at least one liquid high-boiling organic solvent flow promoter; wherein the above percentages are percentages by weight based on the total weight of the nonaqueous constituents and the sum of the nonaqueous constituents is from about 3 to about 20% by weight of the aqueous dispersion.

2. A liquid leather-care composition in accordance with claim 1 wherein constituent (a) is present in from about 20 to about 30% by weight.

3. A liquid leather-care composition in accordance with claim 1 wherein constituent (b) is present in from about 12 to about 20% by weight.

4. A liquid leather-care composition in accordance with claim 1 wherein constituent (c) is present in from about 25 to about 40% by weight.

5. A liquid leather-care composition in accordance with claim 1 wherein constituent (e) is present in from about 12 to about 18% by weight.

6. A liquid leather-care composition in accordance with claim 1 wherein constituent (g) is present in from about 0.05 to about 5% by weight.

7. A liquid leather-care composition in accordance with claim 1 wherein the sum of the nonaqueous constituents is from about 4 to about 12% by weight of the dispersion.

8. A liquid leather-care composition in accordance with claim 1 wherein constituent (a) is present in from about 20 to about 30% by weight; constituent (b) is present in from about 12 to about 20% by weight; constituent (c) is present in from about 25 to about 40% by weight; and constituent (e) is present in from about 12 to about 18% by weight.

9. A liquid leather-care composition in accordance with claim 8 wherein the sum of the nonaqueous constituents is from about 4 to about 12% by weight of the dispersion.

10. A liquid leather-care composition in accordance with claim 1 wherein constituent (a) is a montanic acid ester wax having a dropping point of from 75 to 90° C., an acid number of from 25 to 35 and a saponification number of from 115 to 155.

11. A liquid leather-care composition in accordance with claim 1 wherein constituent (c) is a polyurethane resin produced from an aliphatic diisocyanate containing from 8 to 38 carbon atoms and a component selected from the group consisting of an aliphatic, hydroxyl-terminated polyester having an average molecular weight of from about 500 to about 5000 and an aliphatic, hydroxyl-terminated polyether having an average molecular weight of from about 200 to about 6000.

12. A liquid leather-care composition in accordance with claim 1 wherein constituent (d) is a polyacrylic acid having an average molecular weight of from about 1000 to about 100,000.

13. A liquid leather-care composition in accordance with claim 1 wherein component e) is an adduct of from 6 to 30 moles of ethylene oxide and either a primary alcohol containing from 12 to 18 carbon atoms or an alkyl phenol containing from 6 to 14 carbon atoms in the alkyl chain, or a mixture of these adducts.

14. A liquid leather-care composition in accordance with claim 1 wherein the nonaqueous constituents comprise:
 (a) from about 20 to about 30% by weight of montanic acid ester wax having a dropping point of from about 75 to about 90° C., an acid number of from about 25 to about 30 and a saponification number of from about 115 to about 155;
 (b) from about 12 to about 20% by weight of lanolin;
 (c) from about 25 to about 40% by weight of a dispersible, film-forming aliphatic polyurethane resin produced from an aliphatic diisocyanate containing from 8 to 38 carbon atoms and a hydroxyl-terminated aliphatic polyester having an average molecular weight of from about 500 to about 5000 or an aliphatic hydroxyl-terminated polyether having an average molecular weight of from about 200 to about 6000;
 (d) from about 1 to about 4% by weight of polyacrylic acid having an average molecular weight of from about 1000 to about 100,000;
 (e) from about 12 to about 18% by weight of an adduct of from 6 to 30 moles of ethylene oxide and primary alcohols containing from 12 to 18 carbon atoms or alkyl phenols containing from 6 to 14 carbon atoms in the alkyl chain or a mixture of these adducts;
 (f) from 0 to about 2% by weight of mono-, di- or triethanolamine or mixtures thereof;
 (g) from about 0.05 to about 5% by weight of at least one of perfume oils, preservatives, foam inhibitors, emulsifying aids and dyes;
 (h) from 0 to 25% by weight of N-methylpyrrolidone; wherein the above percentages by weight are based on the total weight of the nonaqueous constituents and the sum of the nonaqueous constituents is from about 4 to about 12% by weight of the aqueous dispersion.

* * * * *